Apr. 24, 1923.
G. H. HARVEY
VEHICLE LIGHTING DEVICE
Filed Aug. 8, 1921
1,453,226
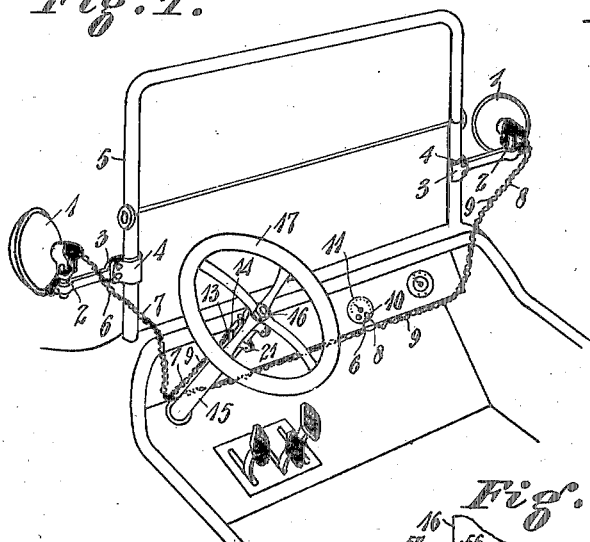
Fig. 1.
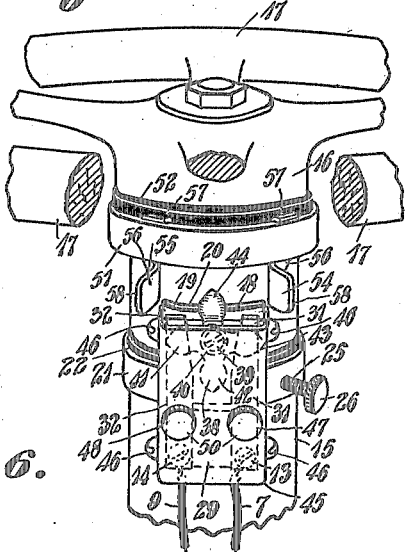
Fig. 2.
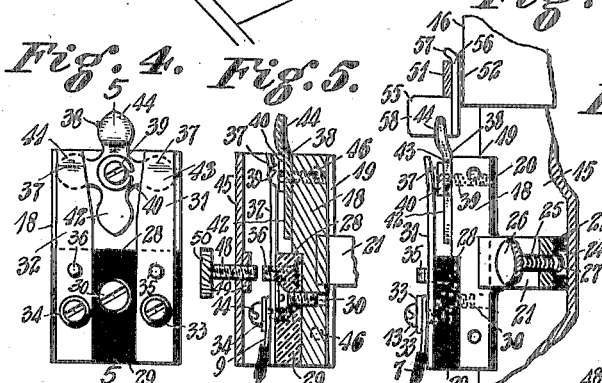
Fig. 4. Fig. 5. Fig. 6.
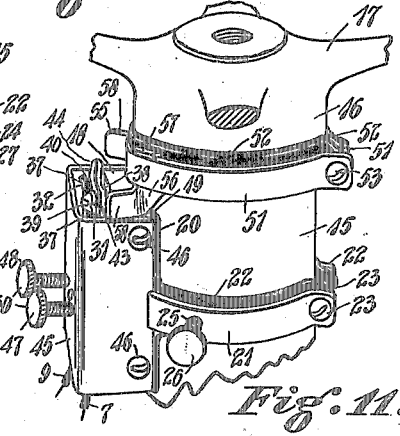
Fig. 3.
Fig. 7.
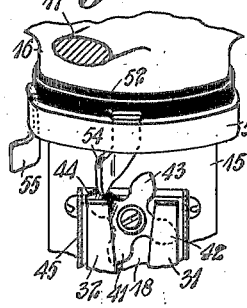
Fig. 8.
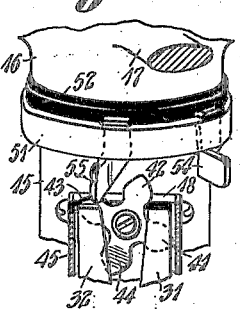
Fig. 9. Fig. 10.
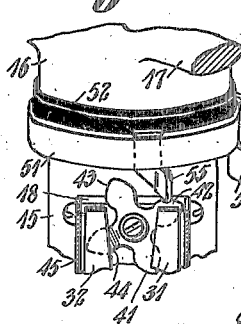
Fig. 11.
Inventor
By Gerald H. Harvey
Clarence Perdew
Attorney.

Patented Apr. 24, 1923.

1,453,226

UNITED STATES PATENT OFFICE.

GERALD H. HARVEY, OF CINCINNATI, OHIO.

VEHICLE LIGHTING DEVICE.

Application filed August 8, 1921. Serial No. 490,660.

*To all whom it may concern:*

Be it known that I, GERALD H. HARVEY, a citizen of the United States, residing at Cincinnati, in the county of Hamilton and State of Ohio, have invented certain new and useful Improvements in Vehicle Lighting Devices, of which the following is a specification.

My invention relates to vehicle illumination, and its object is to provide for lighting the road to either side of the vehicle when the latter is rounding a curve. A particular object is to provide for prompt automatic lighting of this kind, in the first stages of curve-rounding, but to avoid false lighting of this kind incident to slight turning movements. Further objects are to install the device in such a way that there will be a minimum amount of apparatus, readily accessible to the driver, for care or adjustment, or manual operation; and to make the installation convenient and well within the ability of a person unskilled in mechanical construction or assemblage. Other objects will appear in the course of the ensuing description.

I attain these objects by the device illustrated, for example, in the accompanying drawing, in which—

Figure 1 is a perspective view of part of a motor vehicle with my invention installed thereon;

Fig. 2 is a similar view, enlarged, taken from the front of the steering post, showing how the switch is installed thereon, in conjunction with the steering wheel, parts of which are broken away for lack of space;

Fig. 3 is a similar view, from the left side of the vehicle, further illustrating this switch mounting;

Fig. 4 is a detail front view of the switch with its casing removed, showing its interior details;

Fig. 5 is a vertical section on the plane of the line 5—5 of Fig. 4, but with the casing in place;

Fig. 6 is a detail side elevation of the switch and adjacent parts of the steering post and steering-head, the switch casing being omitted, as in Fig. 4;

Fig. 7 is a diagram of the electrical connections; and Figs. 8, 9, 10 and 11 are perspective views similar to Fig. 2, illustrating different stages of the operation of the switch in conjunction with the operation of the steering wheel and head.

In the present example, lamp-casings 1 are mounted by means of universally swiveling connections 2 on the outer end parts of brackets 3, which have jaws 4 by which they are clamped to respective opposite sides of the wind-shield 5 of the vehicle, as shown in Fig. 1. I prefer to have these lamp-casings constructed so as to be readily assembled with their connections 2 and with well known incandescent electric lamps such as are used on vehicles; and to have reflectors comprised in these casings which will afford a relatively wide distribution of the rays from the lamp. This lamp construction and mounting being the subject of a separate invention, however, which, while preferable in connection with the present invention, is not essential thereto, it is not disclosed in detail herein.

Lamp cords, each consisting of two conductors, lead from the respective lamp-casings 1, it being understood that the casing in each instance is arranged so that each conductor connects with a respective terminal of the lamp therein, as indicated in Fig. 7. Thus, from the left-hand lamp-casing 1, the conductors 6 and 7 lead; and from the right-hand lamp-casing 1, the conductors 8 and 9 lead. Both conductors 6 and 8, from the opposite lamps, are connected to one battery terminal 10, or to one terminal of any equivalent source of electrical energy with which the vehicle is provided; the other terminal or pole of this current source being connected, usually, to the general metal structure of the the vehicle, or, as it is termed, grounded. Thus, as seen in Fig. 1, these conductors 6 and 8 connect to the terminal 10 on the coil box 11 in the cowl of the vehicle; in practice, these conductors 6 and 8 are in a single piece, continuous from one lamp to the other, with the insulation removed for a short space to connect at the terminal 10. In Fig. 7, the battery 12 will be understood to represent either a primary or secondary battery, a magneto, a dynamo, or any other current source encountered.

The other two conductors 7 and 9, of the respective lamps lead to respective terminals 13 and 14 of the switch, which is on the steering post 15 of the vehicle, up close to the steering head 16, or hub of the steering wheel 17, thereof. It is the purpose of this switch to automatically ground, or connect with the aforesaid opposite terminal of the current source 12, either one of the other two conductors 7 and 9, accordingly as the steering wheel is turned in one direction or the other, to steer the vehicle to the left or to the right.

As I prefer to construct this switch, it comprises a base block 18 elongated up and down, and channeled on its back 19, fitting snugly on and partly around the front of the steering post 15, with an insulating sheet 20 between it and the post. A band 21 is fixed to this block 18, in a groove transversely across its channeled back 19 about midway of its height; this band 21 bending around the post 15 in both directions, to the rear thereof, with extensions 22 of the insulating sheet 20 between them and the post. At the back of the post, these band parts are bent outward close to their ends, and a bolt 23 is passed through these bent-out parts, clamping the band 21 tightly around the post 15 and rigidly mounting the block 18 thereon, with the block insulated from the post. A short distance to one side of the block 18, the insulating extension 22 has an opening 24, and a screw 25 is tapped through the band 21, to make contact with the surface of the steering post 15 through this opening 24; the screw having a head 26 for ready turning with thumb and finger, and the tip of the screw being enlarged inside the band 21, as at 27 (Fig. 6,) to prevent entire unscrewing from the band 21.

The front of the block 18 has a shoulder 28 just above its middle, by making the lower part of the block thinner than the upper part; and against the front of this thinner lower part, up against the shoulder 28, is fitted an insulating block 29, held by a single screw 30 near its center, extending back therethrough into the base block 18; the shoulder 28 preventing turning of this insulating block 29. It is on this block 29 that the terminals 13 and 14 of the switch are mounted; these terminals being screws tapped into the insulating block 29 but not extending therethrough into contact with the base block 18. Each terminal or screw 13 or 14 holds a respective tongue 31 or 32 on the block 29, under the end part of the respective conductor 7 or 9, which is bent around the screw under a washer 33 or 34, in a well known manner. Shortly above these screws 13 and 14 are screws 35 and 36, passing out through the insulating block 29 and tapped through the respective tongues 31 and 32; the heads of these screws 35 and 36 being flat and countersunk into the inner side of the block 29 to avoid contact with the base block 18. Thus, the tongues 31 and 32 are held tightly on the front of the block 29 and prevented from moving sidewise, by the two screws in each one. The screws 35 and 36 project out considerably past the fronts of the tongues; and each tongue extends up above the top of the block 29, to about the level of the top of the base block 18; being bent forward to a slight degree in its upper end part 37. These switch tongues 31 and 32 are spaced transversely across the block 29, leaving space for insertion of the screw 30 at the middle of the block.

Near the top of the base block 18, on the front face thereof, the star-wheel or radiated member 38 is journaled on a screw 39 tapped into the block 18, at the middle, with a spring-washer 40 against its front. This wheel 38 comprises four arms 41, 42, 43 and 44, radiating from its hub; each arm being designed somewhat as a gear tooth. Three of these arms, 41, 42 and 43, are substantially entirely within the plane of the wheel hub, swinging close to the front face of the block 18, well away from the tongues 31 and 32; but the fourth arm 44 has a compound bend so that its end part is offset forwardly and will make firm contact with either tongue 31 or 32 when swung around thereto. The wheel 38 is journaled high enough for each arm to swing substantially entirely above the top of the base block 18 in the uppermost quarter of the swing of the arm as the wheel rotates. The switch-casing 45 is a plate bent into a channel, with the channel sides extending back and flanking the sides of the base block 18 and insulating block 29; these sides being fastened to the base block 18 by screws 46 passed through the sides into the edges of the block near the top and bottom thereof. These sides hold the front of this casing 45 well forward from the terminals or screws 13 and 14, and from the upper parts of the tongues 31 and 32; the casing 45 ending above and below substantially even with the top and bottom of the base block 18. Screws 47 and 48 are tapped through the front of the casing 45 and through a small reinforcing strip 49 inside thereof; these screws being located to contact with the tips of the outwardly passed screws 35 and 36, respectively, in the tongues 31 and 32, when screwed inward. They are similar to the screw 25, with heads 50 for turning them.

Near the bottom of the steering head or steering wheel hub 16, a band 51, similar to the band 21, passes around the hub 16, with a strip of insulating material 52 between it and the hub, and with bent-out parts at the rear, having a bolt 53 passed through them, tightly clamping the band around the hub. However, before completely clamping this band, trip-brackets 54 and 55 are slipped behind the band at the front, a short distance to the right and left, respectively, of the front upright center line of the switch and its wheel 38. Each bracket 54 or 55 comprises an upper lug 56 to lie under the band 51, with a slight flange 57 to extend out over the top edge of the band, and a lower lug 58 to extend down below the bottom of the hub 16 and extend forward to engage with the arms of the wheel 38 upon rotation of the hub 16 a material steering distance to the left or right Such a bracket is readily made of a sheet metal blank of L-shape, with the bottom of the L bent at about right angles to the upright thereof, as seen in the drawing.

The radiated member or wheel 38 is set with its bent arm 44 uppermost when the steering wheel and its hub 16 are in the position to steer the vehicle straight ahead, and the brackets 54 and 55 are positioned at the right and left, respectively, on the hub 16 while in this position, far enough from the arm 44 not to materially shift this arm and the wheel 38 upon the slight involuntary or incidental turnings of the steering wheel which are practically unavoidable in driving the vehicle, but close enough to the arm 44 to engage and push the arm over to the left or right upon a material turning of the steering wheel in that direction, purposely to steer the vehicle in that direction.

The normal straight-ahead positions of the parts is seen in Figs. 1 to 7. In Fig. 8 is seen their positions upon a material steering movement of the wheel and its hub 16 to the right, it being remembered that Fig. 8 is a front view, with the left of the vehicle at the reader's right. It will be seen that the left-hand bracket 54 has pushed the arm 44 over and down to the right (of the vehicle) where this arm 44 makes contact with the right-hand switch tongue 32. Referring to the diagram of Fig. 7, it can be seen that this will pass current from source 12, through conductor 8, lamp in right-hand casing 1, conductor 9, terminal 14 and tongue 32, arm 44, base 18, band 21, and screw 25, to ground or other terminal of current source 12, through steering-post 15 and the connected general metal structure of the vehicle. Thus the right-hand lamp will light the roadway at the right of the vehicle as soon as steering begins to the right.

If the curve of vehicle travel is to be of large radius, a turning of the steering wheel 17 and hub 16 through a relatively small angle suffices; and upon completing the curve and restoration of the steering parts to straight-ahead positions, the left-hand bracket 54 that pushed the arm 44 to the right will engage with the arm 43 that became uppermost (Fig. 8) from the steering operation, and will push this arm 43 over and down to the left (of the vehicle) and thus bring the bent arm 44 again to upright mid-position, out of contact with the right-hand switch tongue 32, breaking the circuit just described, and extinguishing the light no longer needed. A like operation would occur upon steering to the left; the right-hand bracket 55 would push the arm 44 over and down to the left, to make contact with the left-hand switch tongue 31, completing a circuit through the source 12, conductor 6, left-hand lamp, conductor 7, terminal 13 and tongue 31, arm 44, base 18, band 21, and screw 25, to source 12 through post 15 and connected parts. Then the bracket 54 would act with the arm 41 on return.

For a curve of small radius to be followed by the vehicle, it is necessary to turn the steering wheel 15 and its hub 16 through a greater angle; the maximum being 360°, or a complete revolution of these parts, for the sharpest turn, on practically all vehicles. I provide for this substantially 360° of turning of these parts by the addition of the arm 42 opposite the arm 44; this arm operating as seen in Figs. 9, 10 and 11. Thus, in Fig. 9, the wheel 17 has been turned almost 360° to the right, so that the right-hand bracket 55 is passing over the switch. It has engaged the arm 43 that was brought up at the beginning of the steering wheel turning as before described, and has pushed this arm 43 over and down to the right (of the vehicle) and brought up the next arm 42, while the bent contact arm 44 has been swung farther down, still contacting, however, with the tongue 32 down close to the base thereof; the lower parts of these tongues being made amply wide to provide for this. Consequently, the circuit for the right-hand lamp is still closed, and the right of the roadway still lighted, as required. This condition will continue, as the full 360° turning of the wheel 17 is completed, as will be understood from Fig. 9.

Now, when the vehicle turning is completed, and the steering parts are to be brought back to straight-ahead positions, the right-hand bracket 55, returning, will engage with the arm 42 that was brought up by the extreme turn, and will push this arm 42 over and down to the left (of the vehicle) as seen in Fig. 10, bringing the bent contact arm 44 farther up along the right-hand tongue 32, still keeping the electrical circuit closed and lighting the roadway to the right. This condition will continue until the steering wheel 17 has been turned back through most of the 360°, to the position of Fig. 11; it being understood that this return usually is made comparatively quickly, to take up the straightway travel, now that the sharp curve has been rounded. However that may be, when this almost complete return has been attained, the left-hand bracket 54 now will engage with the arm 43, the same as if only a small turn of the steering wheel 17 had been made; this arm 43 having been brought uppermost by the engagement of the right-hand bracket 55 with the arm 42 at beginning of return from the extreme position, as in Fig. 10. The left-hand bracket 54 will now push the arm 43 over and down to the left, bringing the bent contact arm 44 uppermost, to the middle, out of contact with the right-hand tongue 32, breaking the circuit and extinguishing the right-hand lamp, as required, now that the vehicle is to go straight ahead again; upon which the parts are all restored to their positions of Figs. 2 to 7, inclusive. For such an extreme turning of the steering wheel 17 and its hub 16 to the left, a similar operation will occur, the other additional arm 41 serving at the extreme stage as the arm 43 did in the above described operation, by virtue of being brought uppermost at the inception of the turning, being engaged by the left-hand bracket 54 as nearly 360° of turning is completed, thus bringing up the arm 42, to be pushed down to the right upon return of the bracket 54, again raising the arm 41, to serve as the arm 43 did in the right-hand turn, for restoring the bent arm 44 to upright non-contacting position in the final return stage. In that way the left-hand lamp would be lighted throughout the left-hand steering operation and return therefrom, and be extinguished as soon as straight-ahead positions are again reached.

The spring washer 40 affords sufficient frictional resistance to hold the wheel in any position to which it is set by the brackets 54 and 55 in any of the described operations. The slight forward bends of the tongues in their upper end parts 37 freely admit the bent arm 44 of the wheel 38, which arm 44 preferably is made somewhat concave on its front face, for the same reason. The arm 44 is bent forward far enough to slightly force the tongue 31 or 32 forward, making firm electrical contact.

When the screw 25 is screwed out in the band 21, away from the steering-post surface, the circuit is broken even if the arm 44 does contact with a tongue 31 or 32. Thus the device can be rendered inoperative when traveling in daylight, or on well lighted streets or roads at night. If either one of the screws 47 or 48 is screwed in so that it contacts with the screw 35 or 36, respectively, the left or right-hand lamp is lighted, as the case may be, independently of the operation of the wheel 38. Thus, the driver can light the roadway at right or left without turning the vehicle in that direction, or while the vehicle is stopped. This is convenient for reading signs or guide-posts along a dark road, for example. I also add to this convenience by locating the lamps back near the driver's seat, rather than far out in front, as are the usual headlights, or as are any prior side-lights for the purpose of lighting the roadside in conjunction with steering operation, within my knowledge. By locating the lamps thus, in a device of this character, directing them slightly downward, a correspondingly larger field of illumination is provided, than with lamps mounted far forward, nearer the ground. And for observation at the roadside with the aid of these lamps, an illumination field of a given size is brought nearer to the driver; so that it is not necessary to make the observation at such a distance in order to obtain the desired size of illumination field.

The screws 25 and 47 and 48 for manual control are all within very easy reach of the driver, as is the entire apparatus, including the lamps, when located as shown, or as just pointed out. Also, the entire equipment is in a protected part of the vehicle, close to the usual current source, requiring a minimum of wiring and connections. The switch, and the brackets 54 and 55, are readily attached and adjusted, even by an unskilled person; and once adjusted, are not easily displaced.

The construction of the switch disclosed is adapted for the use of metal as the material of the base block 18; this being preferred owing to the strength thus afforded for this part, and to the simplicity of connection through the controlling screw 25 and the manual operating screws 47 and 48. Similarly, the insulating strip 52 is provided entirely throughout the band 51 that attaches the brackets 54 and 55 to the hub 16, because these brackets preferably are of metal, and they contact with the bent arm 44 while it contacts with either tongue 31 or 32, which would result in lighting one or the other lamp independently of the screw 25, when the latter is out of contact with the steering post 15, in daytime, or at other times when lighting is not desired. This strip 52 also affords the desired friction between it and the hub 16, and the brackets 54 and 55. The strip 22 similarly provides the desired friction between it and the steering post 15, and the parts attached thereto, in addition to insulating those parts. It will be understood that other insulating and frictionally holding arrangements may be provided; for instance, the brackets 54 and 55 may be individually insulated, or they may be made of non-conducting material.

In any event, it is desirable that these brackets 54 and 55 be separately adjustable around the hub 16; as different vehicles require different ranges of movement of the steering means before lighting is effected, requiring the brackets to be different distances apart. Once the required distance is found, the switch can be adjusted to one side or the other on the steering post 15, should the bracket adjustment, when reached, fail to have the wheel 38 substantially midway between them at straight-ahead position. The parts may be adjusted so that the switch is at either side, or at the rear, if desired. Also, on many cars, the steering-wheel and post construction includes details requiring modifications in the bracket design and arrangement. Other modifications may be made, in application to various vehicles, or under varying conditions. Therefore, I do not wish to be understood as being limited to the precise showing and description herein, but what I claim as new and desire to secure by Letters Patent is:

1. In a vehicle-lighting device, in combination with a vehicle, a steering-member on said vehicle, and a plurality of lamps on said vehicle, movable lamp-controlling means lighting one lamp or the other upon a requisite movement in one direction or the other, and engaging means carried by said steering-member momentarily engaging with said controlling means during steering movement in either direction and imparting said movemet to said controlling means in one direction or the other entirely during the momentary engagement.

2. In a vehicle-lighting device, in combination with a vehicle, a steering-member on said vehicle, and a plurality of lamps on said vehicle, movable lamp-controlling means, and a plurality of engaging means carried by said steering-member, out of engagement with said controlling means during steering in general straight-ahead direction, but one or the other of said engaging means of said steering member engaging with said controlling means during steering movement in one side direction or the other, to move said controlling means in one direction or the other to light one or the other of said lamps.

3. In a vehicle-lighting device, in combination with a vehicle, a steering-member on said vehicle, and a plurality of lamps on said vehicle, movable lamp controlling means having a plurality of engaging parts, and a plurality of engaging means carried by said steering-member out of engagement with said controlling means during steering in general straight-ahead direction, but successive engaging means of said steering-member engaging with successive ones of said parts during steering movement in one side direction or the other, to move said controlling means in one direction or the other to light one or the other of said lamps.

4. In a vehicle-lighting device, in combination with a vehicle, a steering-member on said vehicle, and a plurality of lamps on said vehicle, movable lamp-controlling mean lighting one lamp or the other upon movement in one direction or the other, engaging means carried by said steering-member, momentarily engaging with said controlling means to light one of said lamps upon steering movement in one direction, engaging means carried by said steering-member, momentarily engaging with said controlling means to light the other lamp upon steering movement in the other direction, and means whereby said engaging means may be adjusted relatively to each other and to said controlling means.

5. In a vehicle-lighting device, in combination with a vehicle, a stationary steering post on said vehicle and a steering wheel on said steering post, a plurality of lamps on said vehicle, movable lamp-controlling means on said steering post, near said steering wheel, lighting one lamp or the other upon a requisite movement in one direction or the other, and engaging means carried by said steering wheel, momentarily engaging with said controlling means during rotation of said steering wheel in either direction and imparting said movement to said controlling means in one direction or the other entirely during the momentary engagement.

6. In a vehicle-lighting device, in combination with relatively movable steering parts, a switch on one of said parts, comprising a rotary member having a plurality of arms, and a tongue to be contacted by one of said arms, and engaging means on the other part to engage with different ones of said arms to rotate said member and make or break contact of said arm with said tongue.

7. In a vehicle-lighting device, in combination with relatively movable steering parts, a switch on one of said parts, comprising a rotary member having a plurality of arms, and a pair of tongues to be contacted alternately by one of said arms, and a plurality of engaging means on the other part to engage with different ones of said arms to rotate said member in one direction or another upon steering operation of said vehicle in one direction or another and make or break contact of said arm with one or the other of said tongues.

8. In a vehicle-lighting device, in combination with relatively movable steering parts, a switch on one of said parts, comprising a rotary member with a plurality of arms, and a pair of tongues to be contacted alternately by one of said arms, and engaging means on the other part, at opposite sides of said one of said arms when this arm is in contact with neither tongue, one or the other of said engaging means, upon steering movement one way or the other, being adapted to engage with this arm to move this arm into contact with a respective tongue, and to engage one or the other of the non-contacting arms to move said contacting arm out of contact, upon return from said movement.

9. In a vehicle-lighting device, in combination with relatively movable steering parts, a switch on one of said parts, comprising a rotary member with a plurality of arms, and a pair of tongues to be contacted alternately by one of said arms, and engaging means on the other part, at opposite sides of said one of said arms when this arm is in contact with neither tongue, one or the other of said engaging means, upon steering movement one way or the other, being adapted to engage with this arm to move this arm into contact with a respective tongue, and to engage one or the other of two of the non-contacting arms to move said contacting arm out of contact, upon return from said movement, the opposite one of said engaging means, upon continuation of said steering movement, being adapted to engage one of the aforesaid non-contacting arm, further moving said contacting arm in contact with the tongue and bringing a third non-contacting arm into the path of said engaging means, this opposite engaging means being adapted to engage with this third non-contacting arm upon return from the continued movement, to restore the previously engaged non-contacting arm to said path, to be engaged by the first-engaging means as aforesaid upon further return from said movement.

10. In a vehicle-lighting device, a switch comprising a pair of tongues and a plural-armed rotary means between said tongues, only one of the arms contacting with one or the other of said tongues upon rotation of said means one way or the other.

11. In a vehicle-lighting device, a switch comprising a pair of tongues and a plural-armed rotary means between said tongues, one of the arms contacting with one or the other of said tongues upon rotation of said means one way or the other, a support for said tongues and said rotary means, and a movable contact member on said support to connect with one of said tongues independently of said rotary means.

12. In a vehicle-lighting device, a switch comprising a pair of tongues and a plural-armed rotary means between said tongues, one of the arms contacting with one or the other tongue upon rotation of said means one way or the other, means for mounting said rotary means and said tongues on one member of a steering mechanism, a pair of engaging means, and means for mounting these means on another member of said steering mechanism for movement by said mechanism to engage with successive arms of said rotary means.

GERALD H. HARVEY.